Aug. 2, 1949.　　　　G. GRINDROD　　　　2,477,692
METHOD OF CANNING EVAPORATED MILK
AND SIMILAR FOAMY LIQUIDS
Filed March 18, 1946
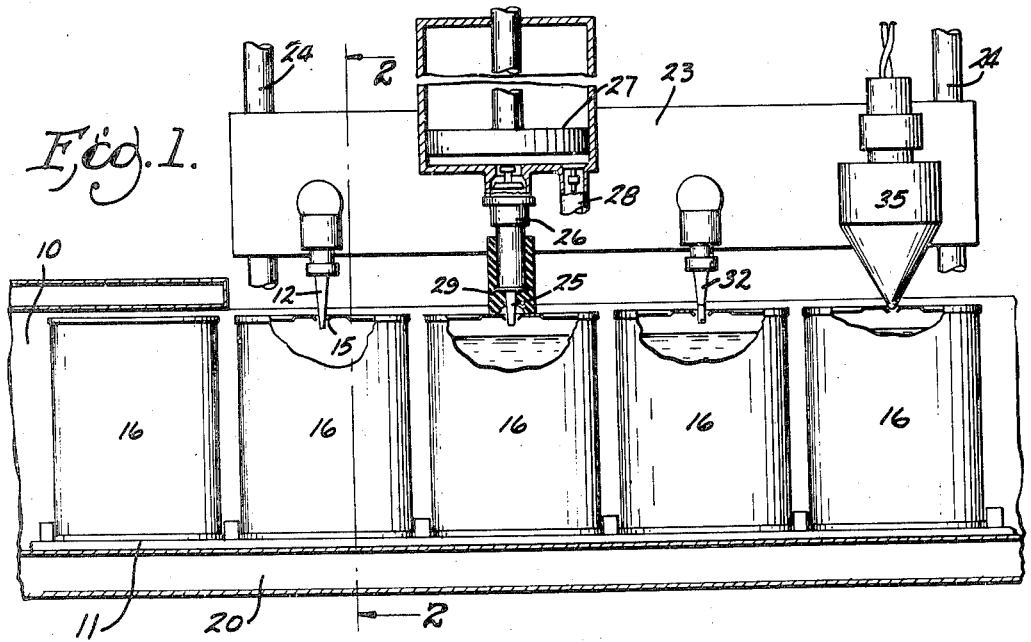
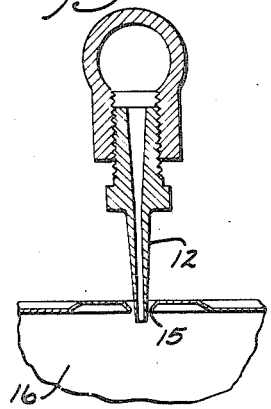
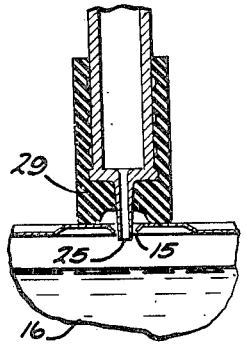
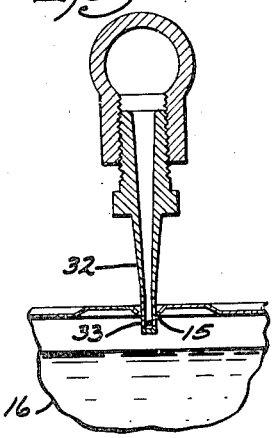
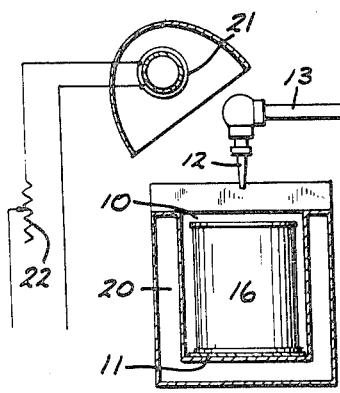
INVENTOR
GEORGE GRINDROD
BY
Wheeler, Wheeler & Wheeler
ATTORNEYS Patented Aug. 2, 1949

2,477,692

UNITED STATES PATENT OFFICE 2,477,692

METHOD OF CANNING EVAPORATED MILK AND SIMILAR FOAMY LIQUIDS

George Grindrod, Oconomowoc, Wis.

Application March 18, 1946, Serial No. 655,111

8 Claims. (Cl. 99—182)

This invention relates to improvements in methods of canning evaporated milk and similar foamy liquids.

Objects of my invention are to avoid the accumulation of foam when filling so-called vent hole cans, to more completely eliminate air from the cans, to expedite and reduce the expense of the canning operation, and make possible the canning of such liquids while hot.

So-called vent hole cans containing 14½ ounces of evaporated milk or other liquid foods have long been used for the reason that they can be made of lighter gage and at less expense than cans which require to be capped after filling. Also, they can be sealed more quickly after the filling operation. The standard size of the so-called vent hole is only 0.111 inch in diameter, the size being limited to that which can be sealed by a single drop of solder. Notwithstanding its small size, the filling methods heretofore followed require this aperture to not only serve as a vent hole but simultaneously as a liquid receiving aperture.

Therefore, by the prior art methods, even an approximate expulsion of air while filling the can with milk, evaporated milk, or other liquid food having a tendency to foam, required the liquid to be canned in a cold or cool condition and more slowly than liquids having little or no tendency to foam. For these reasons, numerous attempts have been made at great expense to devise can filling and sealing equipment which can be automatically operated in a vacuum, or in a chamber filled with inert gas such as carbon dioxide or nitrogen, but so far as I am aware, such equipment has not been made commercially successful, and, in any event, it is extremely expensive and difficult to control.

It is my object to obtain a satisfactory approximation of an air-free canning of hot evaporated milk and similar liquid foods in the open air in view of the operator and subject to his supervision and control.

In the accompanying drawings:

Figure 1 is a side elevation of simplified apparatus adapted for use in the practice of my improved method for the filling and sealing of one or more series of vent hole cans.

Figure 2 is a sectional view taken on line 2—2 of Figure 1.

Figure 3 is an enlarged detail showing a fragment of one of the cans and a steam injecting nozzle in vertical section inserted in the vent hole.

Figure 4 is a detail view of a filling nozzle, and a fragment of a can, the nozzle being shown in vertical section.

Figure 5 is a detail view of a steam nozzle adapted to deliver lateral jets of steam into the residual space above the liquid in a can after a filling operation.

The drawings are intended merely as diagrammatic or conventional illustrations of mechanical devices employable separately or as a system among many which are available for use in the practice of my method.

Like parts are identified by the same reference characters throughout the several views.

In the practice of my method, I first preheat vent hole cans, and then successively I inject steam at a considerable velocity through their vent holes to drive out substantially all of the air and replace it with steam, after which I deliver to each can a predetermined quantity of evaporated milk or similar liquid at a temperature of about 200° F. While this liquid is being delivered, I seal the can against entry of air or other fluid through the vent hole. A sufficient quantity of the hot liquid is so delivered to nearly fill the can. Initially it condenses a considerable portion of the steam, thereby creating a partial degree of vacuum, after which the entering liquid tends to satisfy the vacuum and creates an advancing absolute pressure which substantially equals that of the surrounding atmosphere upon completion of said liquid delivery. Heat radiation from the can is prevented by counter radiation from hot surfaces and approximately 2 B. t. u.'s from the condensed steam are transferred to the liquid, the temperature of which is thus raised to approximately 202° F.

Thereupon I either inject additional steam into the space above the level of the liquid to drive out as much of the residual air as possible, together with the steam formerly injected, and then apply a drop of solder to the vent hole to permanently and hermetically seal the can, or, I solder the vent hole immediately after completing the filling operation. In either case, maintenance of equal pressure within and without the can prevents material interchange of air and steam through the small vent hole in the short space of time between the filling and soldering operations. When the can has been soldered, it is allowed to cool, whereupon a nearly complete vacuum exists between the level of the liquid and the top of the can.

The cans may be preheated in a heating chamber 10, from which they may be successively delivered by a conveyor 11 to a steam injecting and air ejecting station equipped with an adjustable steam nozzle 12 which may be connected by a flexible pipe 13 with a source of steam supply under pressure, preferably of about 10 pounds to the square inch. As best shown in Figure 3, this steam nozzle is of less diameter than the vent holes 15 in the cans 16. A vent hole of standard size is 0.111 inch in diameter, and the steam nozzle is of less diameter, whereby air can escape through the vent hole under pressure of the entering steam. I find that with a steam nozzle at this station having an outlet 0.07 inch in diameter, and with steam pressure at 10 pounds per square inch, 4.61 volumes of steam can be delivered in two seconds into a can having a capacity of 420 cc., and in that time the steam will replace about 99% of the air previously contained therein.

Heat radiating means are provided at the sides and also underneath the conveyor, and partially overlapping the cans above the conveyor to prevent loss of heat from the cans from the time they leave the preheating chamber until the cans are filled with liquid and sealed. This may be accomplished by providing the bottom and sides of the space occupied by the conveyor with a steam heated jacket 20, and by providing electrically heated resistors 21 above the cans on the conveyor, the heat of which is controlled by a rheostat 22.

These heaters are regulated as to temperature in such a manner as to supply sufficient external heat to the cans to prevent the vapor in the cans from contracting, thus maintaining its pressure at substantially atmospheric pressure. The counter-balancing radiation may be so adjusted that the cans will pass from the air displacing station to the sealing station without material influx of air.

The steam injecting, can filling and sealing equipment may be mounted on a lifting head 23 carried by rods 24 above the several operating stations.

After the air has been driven out of the can at the steam injecting and air ejecting station, the steam injecting nozzle is lifted from the can at that station and the latter is then advanced to the filling station. The filling station is provided with a liquid supply nozzle 25 having a connection at 26 with a pump 27 having a suction duct 28 leading from a source of liquid supply (not shown) at a temperature of about 200° F.

The filling nozzle 25 may have a sealing fit in the vent hole, but it is preferably provided with a packing 29 of rubber or equivalent material adapted for pressure contact with the top of the can, to seal it against entry of air. The capacity of the pump is such that at each stroke it delivers 14½ ounces of liquid, which is the required quantity for an individual can of the standard size used for evaporated milk.

On completion of the filling operation performed by a single stroke of the pump, the space above the liquid in the can is equal to about 1/16 of the capacity of the can and remains filled with steam and residual air at substantially atmospheric pressure. On removal of the liquid supply nozzle 25, the can may be advanced directly to a soldering station, or to an intermediate supplemental steam injecting station provided with a steam nozzle 32 which has lateral outlets 33 (Figure 5) through which jets of steam are delivered horizontally or parallel to the surface of the liquid when this nozzle is inserted through the vent hole.

The nozzle 32 is of less exterior diameter than the vent hole, whereby the previously injected steam and some of the residual air may be driven out preparatory to sealing the vent hole. This supplemental steam injection is not essential to my invention, but if it immediately precedes the soldering operation, it tends to insure reduction to a minimum of the residual air in the can.

When the can is advanced by the conveyor to the soldering station, a rotary soldering iron 35 of ordinary type is applied to the vent hole to deliver a drop of molten solder thereto.

As the can reaches the soldering station, the conveyor moves it out of the channel-shaped heating jacket and out from beneath the resistors. The solder immediately solidifies, thus permanently closing and hermetically sealing the can, which is then allowed to cool while it is being conveyed to a suitable point of delivery.

The minimum time required for a steam jet to displace air from an empty can having a capacity of 14½ ounces and a vent hole of 0.111 inch diameter without creating objectionable pressure within the can is probably about 2 seconds. Therefore, with eight steam nozzles simultaneously operating for displacement of air from empty cans, approximately 240 cans per minute may be almost completely filled with steam, about 99% of the air therein being driven out.

The time required for delivering a metered charge of liquid food to such a can under the stated conditions depends upon the viscosity of the liquid. For evaporated milk under five pounds pressure at the source of supply, the interval required for delivering a metered charge to a can of the described capacity is approximately 17 seconds, or about one-half the time required to deliver the same liquid into such a can by prior art methods. The most common equipment heretofore used for filling such venthole cans has 48 filler units or metering groups, and has been capable of filling about 120 cans per minute, whereas by my improved method I am enabled to fill approximately 240 cans per minute with the same equipment.

The time required for each soldering operation with the commonly used rotary soldering cone, is approximately ¼ of a second. Therefore, two cones, sealing alternate cans, coming from a filling apparatus, are capable of soldering about 240 cans per minute. Therefore the number of devices employed at each station in the above described system, and the number of conveyors employed, may be varied in such a manner that all of the devices in each station may be under continuous operation and the number of cans per minute passing each station may be uniform.

If steam injection to displace residual air in the head space of each can between the filling and soldering operations is being practiced, the period of steam injection for this purpose can be made very brief, i. e., about ¼ of a second. Therefore, two nozzles of the type shown at 32 may be utilized to eject as much as possible of the head space residual air from 240 cans per minute.

It is not material to the invention herein disclosed whether the specific means illustrated in the drawings or some other means, in whole or in part, are employed for carrying out the steps of my method, either manually or mechanically.

Also, it is not material to my invention whether the cans are manually or mechanically presented to the nozzle and soldering iron or irons, or whether the nozzle and soldering iron or irons are mechanically or manually presented to the cans, with or without movement of the latter, either continuously or step-by-step.

I claim:

1. The method of filling and sealing receptacles having small inlets with evaporated milk and similar liquids tending to foam, consisting in the steps performed in atmosphere of displacing with steam substantially all of the air in the receptacle, delivering a predetermined weight of said liquid into the receptacle at a temperature slightly below that of the steam therein while otherwise sealing the steam-filled receptacle, the said liquid condensing the steam to accommodate the volume of such liquid, and permanently and hermetically sealing the inlet before any material interchange of fluid through the inlet can occur under such static conditions.

2. That step in the canning in atmosphere of evaporated milk and similar liquids tending to foam, consisting in the delivery of the liquid at a temperature slightly below the boiling point into a closed can filled with steam at a temperature of about 212° F. at the commencement of the delivery of such liquid and simultaneously preventing entry of air or any other fluid during such delivery, whereby to initially condense a large portion of the steam, followed by an advancing absolute pressure as the resulting vacuum becomes satisfied by the liquid.

3. The method of canning evaporated milk and similar liquids in cans which are completely closed with the exception of their vent holes and which are subject externally to the atmosphere, said method comprising jetting steam into the vent hole of each can concurrently with the venting of displaced air through such vent hole from the can, radiating heat to the can and the steam therein to preclude condensation of such steam pending filling, jetting into the can through such vent hole the liquid to be canned therein while sealing the can about the vent hole, such liquid being at a temperature below that of the steam whereby to condense the steam and establish during the initial jetting of such liquid a partial vacuum in the can relieved as the can is filled with such liquid, continuing to jet liquid into the can until the can is nearly full and the vacuum has been relieved, continuing to radiate heat to the can and its contents to maintain pressure within the can at least as high as that of the atmosphere until the can can be sealed, and subsequently sealing the vent hole of the can to complete the canning of such liquid.

4. The method of canning evaporated milk and similar liquids in cans which are completely closed with the exception of their vent holes and which are subject externally to the atmosphere, said method comprising jetting steam into the vent hole of each can concurrently with the venting of displaced air through such vent hole from the can, radiating heat to the can and the steam therein to preclude condensation of such steam pending filling, jetting into the can through such vent hole the liquid to be canned therein while sealing the can about the vent hole, such liquid being at a temperature below that of the steam whereby to condense the steam and establish during the initial jetting of such liquid a partial vacuum in the can relieved as the can is filled with such liquid, continuing to jet liquid into the can until the can is nearly full and the vacuum has been relieved, further injecting steam through such vent hole into the space remaining in the can above the liquid therein, and soldering the vent hole while the pressure in such space remains at least approximately as high as atmospheric.

5. The method of filling vent hole cans with evaporated milk and similar liquid foods, consisting of preheating the empty can to prevent steam condensation, loosely inserting a steam jet nozzle in the vent hole and injecting steam to displace substantially all air and substitute steam therefor, substituting a food injecting nozzle for the steam nozzle while maintaining the steam-filled can externally heated to prevent condensation of its steam, sealing the food injection nozzle around the vent hole to prevent passage through the vent hole of any air or steam during filling, injecting into the can a predetermined volume of the liquid food, then detaching the filler nozzle and applying external heat as required to maintain a static temperature within the can while permanently sealing the vent hole.

6. The method of filling small apertured receptacles with evaporated milk and similar liquid foods, while handling such receptacles in free atmospheric pressure, said method consisting in preheating the receptacles to about 212° F., jetting steam through the apertures to displace substantially all of the air therein, subjecting the steam filled receptacles to external heat to prevent heat loss, injecting liquid food into the receptacles at a temperature lower than 212°, while simultaneously closing the receptacle against entry of external atmosphere around the filler nozzle, stopping food injection and detaching the filler nozzle as each receptacle is sufficiently filled, then injecting additional steam through the aperture of each receptacle to displace any residual air, then sealing the apertures while maintaining the receptacles in static temperature equilibrium by applying external heat.

7. The method of filling small-apertured cans with liquid foods, consisting in passing the cans through a preheating atmosphere of about 212° F., injecting steam through the aperture of each can to expel substantially all of the air in the can, then inserting a filler nozzle which seals around the aperture, filling a metered quantity of liquid food at a temperature sufficiently below that of the steam, to condense an equal volume of steam and completing the filling into the partial, and self-adjusting vacuum left by the condensing steam, then disconnecting the filling nozzle, and sealing the can while in environmental temperature to prevent loss of heat until sealed.

8. The method of air-free filling of liquids into containers, which consists of preheating the container to prevent steam condensation within, then replacing the air within the container with atmospheric-pressure steam, then attaching a filler nozzle which seals vacuumtight around the aperture of the container and injecting the liquid at a temperature lower than the steam, to create a partial vacuum, completing the filling without release of the seal, then detaching the seal and filler nozzle while maintaining the container in a free steam atmosphere, then sealing the container while it is in temperature equilibrium with the surrounding atmosphere.

GEORGE GRINDROD.

REFERENCES CITED

The following references are of record in the file of this patent:

UNITED STATES PATENTS

| Number | Name | Date |
|---|---|---|
| 2,029,303 | Ball | Feb. 4, 1936 |
| 2,188,306 | March | Jan. 30, 1940 |
| 2,209,315 | Ball | July 30, 1940 |
| 2,317,470 | Marx | Apr. 27, 1943 |
| 2,334,327 | Hermann | Nov. 16, 1943 |